(12) United States Patent
Chen et al.

(10) Patent No.: US 10,657,391 B2
(45) Date of Patent: May 19, 2020

(54) SYSTEMS AND METHODS FOR IMAGE-BASED FREE SPACE DETECTION

(71) Applicant: UATC, LLC, San Francisco, CA (US)

(72) Inventors: Kuan-Chieh Chen, Cupertino, CA (US); David Weikersdorfer, Palo Alto, CA (US)

(73) Assignee: UATC, LLC, San Francisco, CA (US)

( * ) Notice: Subject to any disclaimer, the term of this patent is extended or adjusted under 35 U.S.C. 154(b) by 67 days.

(21) Appl. No.: 15/886,434

(22) Filed: Feb. 1, 2018

(65) Prior Publication Data
US 2019/0213426 A1 Jul. 11, 2019

Related U.S. Application Data

(60) Provisional application No. 62/613,845, filed on Jan. 5, 2018.

(51) Int. Cl.
| | |
|---|---|
| *G06K 9/00* | (2006.01) |
| *G06T 7/77* | (2017.01) |
| *G06T 7/73* | (2017.01) |
| *G06T 7/70* | (2017.01) |
| *G05D 1/00* | (2006.01) |
| *G06N 3/08* | (2006.01) |
| *G05D 1/02* | (2020.01) |
| *G06T 7/20* | (2017.01) |

(52) U.S. Cl.
CPC ....... *G06K 9/00798* (2013.01); *G05D 1/0088* (2013.01); *G05D 1/0246* (2013.01); *G06N 3/084* (2013.01); *G06T 7/20* (2013.01); *G06T 7/70* (2017.01); *G06T 7/75* (2017.01); *G06T 7/77* (2017.01); *G06T 2207/10016* (2013.01); *G06T 2207/10028* (2013.01); *G06T 2207/10048* (2013.01); *G06T 2207/20072* (2013.01); *G06T 2207/20076* (2013.01); *G06T 2207/20081* (2013.01); *G06T 2207/30248* (2013.01); *G06T 2207/30252* (2013.01)

(58) Field of Classification Search
CPC ............. G06K 9/00798; G05D 1/0088; G05D 1/0246; G06N 3/084; G06T 7/20; G06T 2207/20081; G06T 2207/30252
USPC .......................................................... 701/28
See application file for complete search history.

(56) References Cited

U.S. PATENT DOCUMENTS

| | | | |
|---|---|---|---|
| 2014/0071240 A1* | 3/2014 | Chen ........................ | G06T 7/70 348/46 |
| 2014/0104393 A1* | 4/2014 | Oho ..................... | H04N 13/246 348/46 |

(Continued)

*Primary Examiner* — Marthe Y Marc-Coleman
(74) *Attorney, Agent, or Firm* — Dority & Manning, P.A.

(57) ABSTRACT

The present disclosure provides systems and methods for image-based free space detection. In one example embodiment, a computer-implemented method includes obtaining image data representing the environment proximate to the autonomous vehicle, the image data including a representation of the environment from a perspective associated with the autonomous vehicle. The method includes reprojecting the image data to generate a reprojected image. The method includes inputting the reprojected image to a machine-learned detector model. The method includes obtaining as an output of the machine-learned detector model, object data characterizing one or more objects in the environment. The method includes determining a free space in the environment based at least in part on the object data.

18 Claims, 12 Drawing Sheets

(56) References Cited

U.S. PATENT DOCUMENTS

| | | | |
|---|---|---|---|
| 2014/0240502 A1* | 8/2014 | Strauss | B60W 30/06 348/148 |
| 2017/0008521 A1* | 1/2017 | Braunstein | G01C 21/32 |
| 2017/0225678 A1* | 8/2017 | Bariant | G01S 15/931 |
| 2018/0173971 A1* | 6/2018 | Jia | G06K 9/00805 |
| 2018/0275657 A1* | 9/2018 | You | G05B 23/0229 |
| 2019/0004535 A1* | 1/2019 | Huang | G05D 1/0251 |
| 2019/0096086 A1* | 3/2019 | Xu | G06T 7/11 |
| 2019/0384294 A1* | 12/2019 | Shashua | G01C 21/3644 |

* cited by examiner

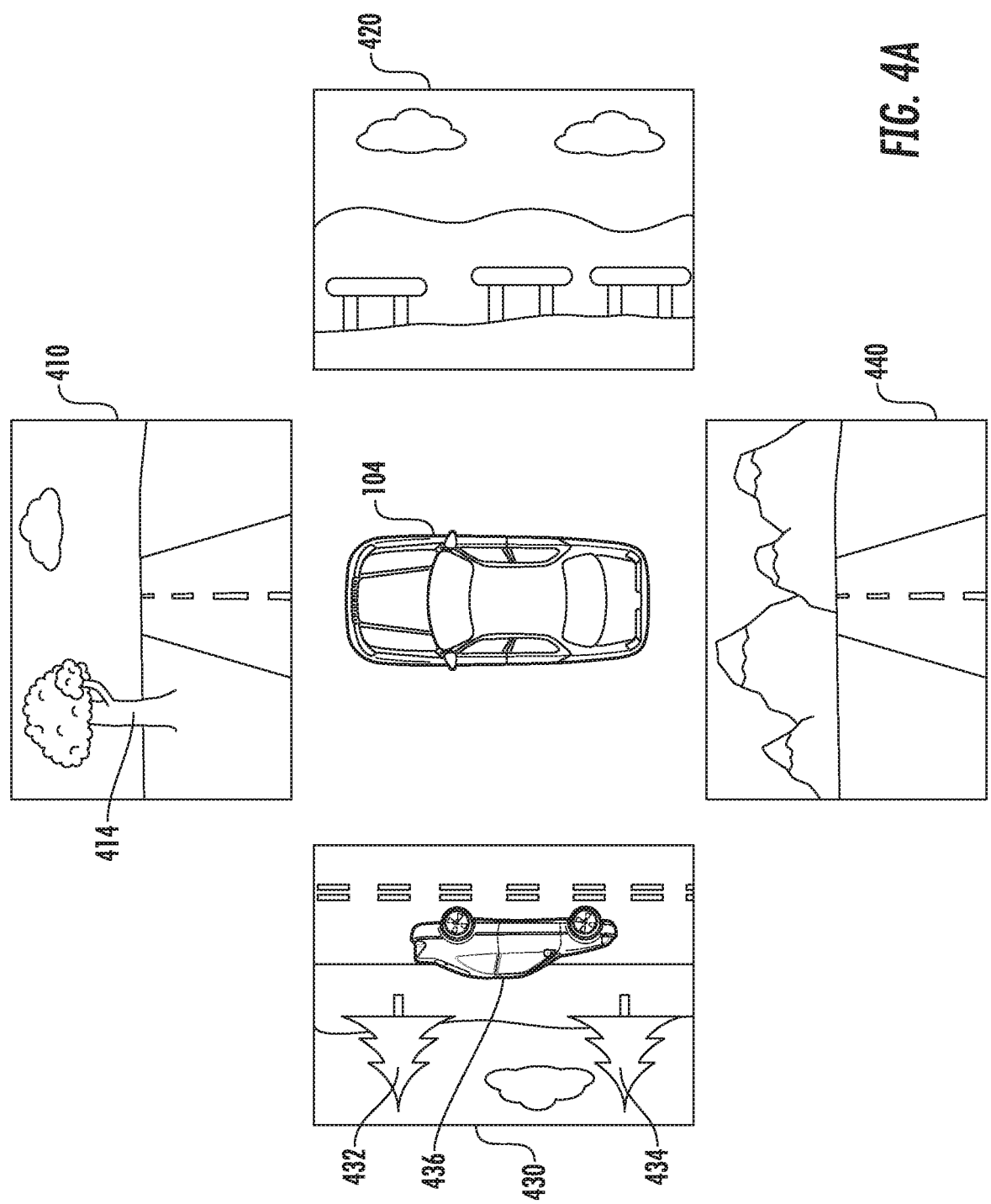

SYSTEMS AND METHODS FOR IMAGE-BASED FREE SPACE DETECTION

PRIORITY CLAIM

The present application claims the benefit of priority of U.S. Provisional Patent Application No. 62/613,845 filed Jan. 5, 2018, entitled "Systems and Methods For Image-Based Free Space Detection." The above-referenced patent application is incorporated herein by reference.

FIELD

The present application relates generally to autonomous vehicles and, more particularly, the systems and methods for controlling an autonomous vehicle using image-based object detection.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for detecting free space in an environment proximate to an autonomous vehicle. The method includes obtaining, by a computing system comprising one or more computing devices, image data representing the environment proximate to the autonomous vehicle, the image data including a representation of the environment from a perspective associated with the autonomous vehicle. The method includes reprojecting, by the computing system, the image data to generate a reprojected image. The method includes inputting, by the computing system, the reprojected image to a machine-learned detector model. The method includes obtaining, by the computing system, as an output of the machine-learned detector model, object data characterizing one or more objects in the environment. The method includes determining, by the computing system, a free space in the environment based at least in part on the object data.

Another example aspect of the present disclosure is directed to a free space detection computing system. The computing system includes one or more processors; a machine-learned detector model that has been trained to receive an input image and, in response to receipt of the input image, output object data characterizing one or more objects in an environment proximate to an autonomous vehicle; and at least one tangible, non-transitory computer readable medium that stores instructions that, when executed by the one or more processors, cause the one or more processors to perform operations. The operations include obtaining an input image that represents the environment proximate to an autonomous vehicle, each pixel of the input image corresponds to a distance value. The operations include inputting the input image to the machine-learned detector model. The operations include receiving, as output of the machine-learned detector model, object data characterizing one or more objects in the environment proximate to the autonomous vehicle. The operations include determining a free space in the environment based at least in part on the object data.

Yet another example aspect of the present disclosure is directed to a non-transitory computer readable medium that stores instructions that when executed by one or more computing devices, cause the one or more computing devices to perform operations. The operations include obtaining image data that represents an environment proximate to an autonomous vehicle, each pixel of the image data corresponding to a distance value. The operations include inputting the image data to a machine-learned detector model. The operations include receiving, as output of the machine-learned detector model, object data characterizing one or more objects in the environment proximate to the autonomous vehicle. The operations include determining a free space in the environment based at least in part on the object data.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIGS. 4A and 4B depict example image data according to example embodiments of the present disclosure;

Figure 1:
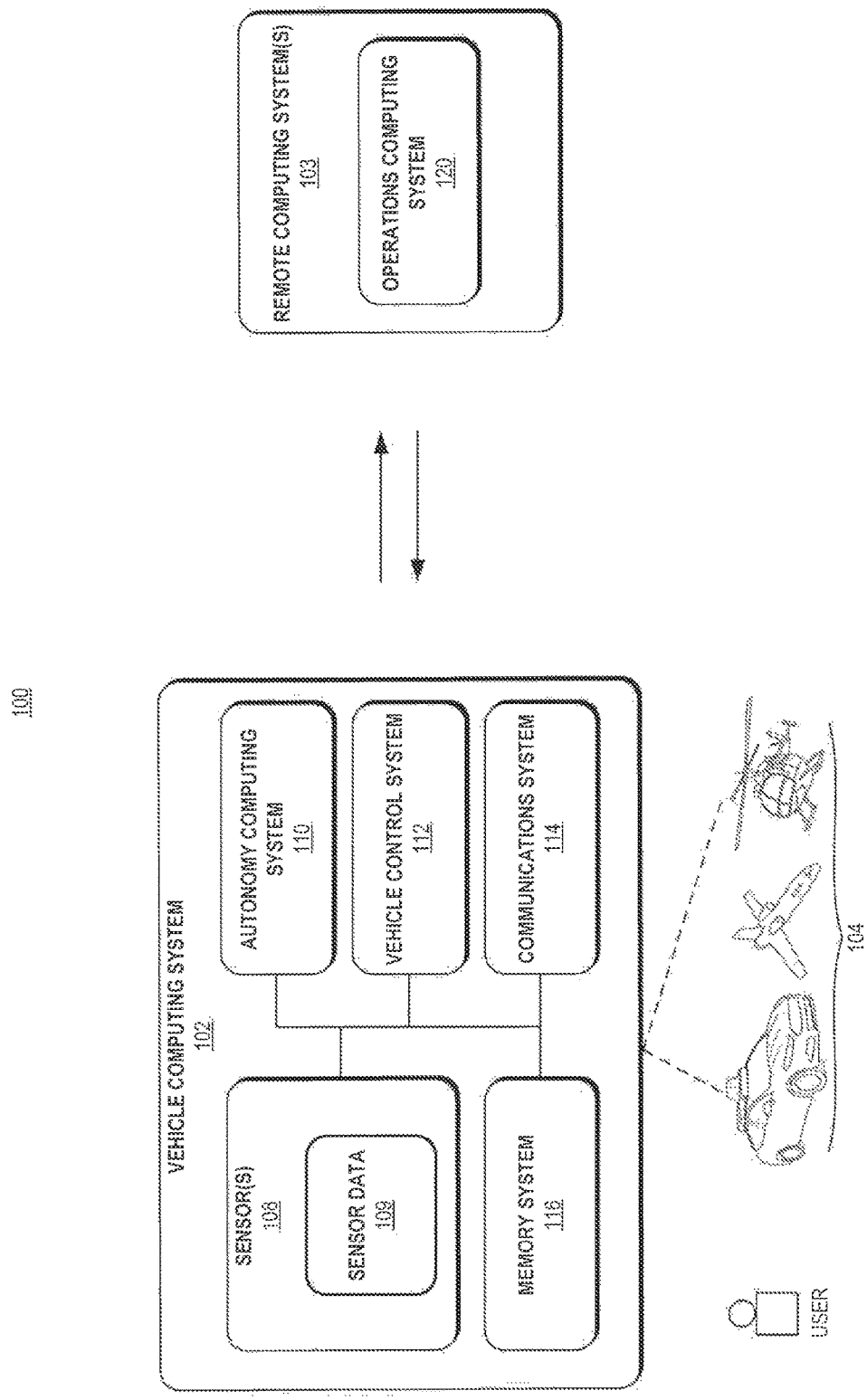
FIG. 1 depicts a block diagram of an example system overview according to example embodiments of the present disclosure.

Reference numerals that are repeated across plural figures are intended to identify the same components or features in various implementations.

DETAILED DESCRIPTION

Generally, the present disclosure is directed to detecting, classifying, and tracking objects, such as pedestrians, cyclists, other vehicles (whether stationary or moving), and the like, during the operation of an autonomous vehicle. In particular, in some implementations of the present disclosure, an autonomous vehicle can include a perception system that implements an object detection system to detect potential objects of interest based at least in part on image data obtained by one or more cameras within a sensor system included in the autonomous vehicle. In some implementations, the object detection system may use the image data with a machine-learned detector model to facilitate the detection of potential objects of interest. In some implementations, the perception system can include a free space detector that determines a free space about the autonomous vehicle based at least in part on the one or more detected objects of interest. The free space can correspond to one or more portions of map data that is free of objects (e.g., one or more portions of a road that are free of objects). In this way, the autonomy system can determine one or more regions in an environment proximate to the autonomous vehicle that the autonomous vehicle can navigate without colliding into an object. In some implementations, the autonomous vehicle can generate a graphical representation of the free space in the environment proximate to the autonomous vehicle.

More particularly, in some implementations of the present disclosure, an autonomous vehicle can include one or more sensor system(s) as part of a sensor system, such as, for example, a camera system, a Light Detection and Ranging (LIDAR) system, and/or a Radio Detection and Ranging (RADAR) system. The sensor system can capture a variety of sensor data indicative of an environment proximate to the autonomous vehicle, and provide the sensor data to a vehicle computing system. The vehicle computing system can use the sensor data for detection, classification, and tracking of objects of interest during the operation of the autonomous vehicle.

In some implementations, the camera system can include a plurality of cameras. Each of the plurality of cameras can be associated with a perspective of the environment proximate to the autonomous vehicle, and can capture sensor data indicative of the environment from the perspective associated with the camera. For example, a camera system can include a front-facing camera that captures sensor data associated with a front-facing perspective of an environment, a rear-facing camera that captures sensor data associated with a rear-facing perspective of the environment, a side-facing camera that captures sensor data associated with a side-facing perspective of the environment, etc. As another example, a camera system can include a plurality of cameras that capture sensor data associated with one or more overlapping perspectives.

In some implementations, the autonomous vehicle can include an object detection system that can implement image-based object detection based on the sensor data indicative of the environment proximate to the autonomous vehicle. The image-based object detection can include generating image data based on the sensor data captured by the camera system, and detecting, classifying, and tracking objects based on the generated image data. The image data can include one or more images that depict the environment proximate to the autonomous vehicle, from one or more perspectives (e.g., front-facing, side-facing, rear-facing, cylindrical, etc.) associated with the camera system. Each of the one or more images can be comprised of one or more pixels that are associated with a plurality of distances in the environment based on the one or more perspectives (e.g., a pixel corresponding to a location nearer to a camera is associated with a shorter distance in the environment than a pixel corresponding to a location farther from the camera).

As an example, an autonomous vehicle can include a front-facing camera that captures sensor data associated with a front-facing perspective of the autonomous vehicle. The autonomous vehicle can generate image data including a front-facing image that depicts an environment proximate to the autonomous vehicle from the front-facing perspective by projecting the sensor data captured by the front-facing camera.

As another example, an autonomous vehicle can include a first camera that captures sensor data associated with a fish-eye perspective, and a second camera that captures sensor data associated with a zoom perspective. The autonomous vehicle can generate image data including a first image that depicts an environment proximate to the autonomous vehicle from the fish-eye perspective, and a second image that depicts the environment from the zoom perspective. The first image can be comprised of one or more pixels that are associated with a plurality of distances in the environment based the fish-eye perspective of the first camera (e.g., a pixel near the center of the first image can be associated with a first distance in the environment, and a pixel near the edge of the first image can be associated with a second distance in the environment). The second image can be comprised of one or more pixels that are associated with a plurality of distances in the environment based on the zoom perspective of the second camera (e.g., a pixel near the center of the second image can be associated with a third distance in the environment, and a pixel near the edge of the second image can be associated with a fourth distance in the environment).

In some implementations, the autonomous vehicle can reproject one or more images in the image data to generate one or more reprojected images (e.g., top-down images) that depict the environment proximate to the autonomous vehicle. Each of the one or more reprojected images can be comprised of one or more pixels that are associated with a single fixed distance in the environment (e.g., each pixel is associated with a same distance in the environment).

As an example, an autonomous vehicle can reproject a first image associated with a fish-eye perspective to generate a first reprojected image. The first image can be comprised of one or more pixels that are associated with a plurality of distances in the environment based on the fish-eye perspective (e.g., a pixel near the center of the first image can be associated with a first distance in the environment, and a pixel near the edge of the first image can be associated with a second distance in the environment). The first reprojected image can be comprised of one or more pixels each associated with a single fixed distance in the environment (e.g., each pixel of the first reprojected image is associated with a same distance in the environment).

In some implementations, the autonomous vehicle can generate image data that includes a stitched image (e.g., cylindrical image). The autonomous vehicle can reproject the stitched image to generate a reprojected image.

As an example, an autonomous vehicle can aggregate sensor data captured by a plurality of cameras, and project the aggregated sensor data to generate a stitched image. The autonomous vehicle can generate a reprojected image by reprojecting the stitched image. As another example, an autonomous vehicle can generate image data that includes a plurality of images associated with a plurality of perspectives, each of the plurality of images generated by projecting sensor data captured by a corresponding camera. The autonomous vehicle can stitch the plurality of images to generate a stitched image. The autonomous vehicle can reproject the stitched image to generate a reprojected image.

As another example, an autonomous vehicle can generate image data based on sensor data captured by a plurality of cameras that form an approximately 360-degree horizontal periphery around the autonomous vehicle. The autonomous vehicle can generate image data that includes a plurality of images corresponding to each of the plurality of cameras, and stitch the plurality of images to generate a cylindrical image. The cylindrical image can depict an approximately 360-degree perspective of an environment proximate to the autonomous vehicle. The autonomous vehicle can reproject the cylindrical image to generate a reprojected image.

In some implementations, the autonomous vehicle can reproject one or more images in the image data to generate one or more reprojected images (e.g., top-down images), and stitch the one or more reprojected images to generate a stitched image.

As an example, an autonomous vehicle can obtain sensor data captured by a plurality of cameras. The autonomous vehicle can generate image data that includes a plurality of images associated with a plurality of perspectives, each of the plurality of images generated by projecting sensor data captured by a corresponding camera. The autonomous vehicle can reproject the plurality of images to generate a plurality of reprojected images. The autonomous vehicle can stitch the plurality of reprojected images to generate a stitched image.

As another example, an autonomous vehicle can generate image data based on sensor data captured by a plurality of cameras that form an approximately 360-degree horizontal periphery around the autonomous vehicle. The autonomous vehicle can generate image data that includes a plurality of images corresponding to each of the plurality of cameras, and reproject the plurality of images to generate a plurality of reprojected images. The plurality of reprojected images can depict an approximately 360-degree perspective of an environment proximate to the autonomous vehicle. The autonomous vehicle can stitch the plurality of reprojected images to generate a reprojected cylindrical image. The reprojected cylindrical image can depict an approximately 360-degree perspective of an environment proximate to the autonomous vehicle.

In some implementations, the image-based object detection can include inputting image data (e.g., reprojected image data) into a machine-learned detector model, such as, for example, a convolutional neural network, to produce machine-learned detector model outputs. The machine-learned detector model outputs can include output object data characterizing one or more objects in the environment represented by the image data for use in the vehicle computing system of the autonomous vehicle, such as in perception, prediction, motion planning, and vehicle control. For example, a machine-learned detector model can output object data including object detection, object classification (e.g., whether an object is moving or stationary, whether an objects is one of a predetermined type of classes such as pedestrians, vehicles, etc.), and object tracking (e.g., a distance to an object).

In some implementations, the machine-learned detector model can include one or more neural networks (e.g., deep neural networks), support vector machines, decision trees, ensemble models, k-nearest neighbors models, Bayesian networks, or other types of models including linear models and/or non-linear models. Example neural networks can include feed-forward neural networks, convolutional neural networks, recurrent neural networks (e.g., long short-term memory (LSTM) recurrent neural networks, gated recurrent unit (GRU) neural networks), or other forms of neural networks.

In some implementations, in response to an image provided as input, the machine-learned detector model can output object data characterizing one or more objects in an environment depicted by the input image. For example, a machine-learned detector model can output object data that includes a detection of one or more objects of interest, a prediction of the class of each object, and a prediction (or estimation) of properties of each object which may include, but are not be restricted to, one or more of position, distance, heading, size, velocity, and acceleration. Additionally, in some implementations, the machine-learned detector model can output a confidence score indicative of a determined likelihood that an identification, prediction, and/or estimation is correct.

In some implementations, a training computing system can train the machine-learned detector model to determine object data characterizing one or more objects, based on a detector training dataset. The detector training dataset can include a large number of previously obtained input images and corresponding labels that describe corresponding object data for objects within such input images.

In some implementation, the detector training dataset can include a first portion of data corresponding to input image data originating from one or more cameras at one or more times. Depending on the model, the input image data can include one or more images obtained by a camera, one or more stitched images, one or more reprojected images, or combinations of such images. The image data can, for example, be recorded while an autonomous vehicle is in navigational operation. The detector training dataset can further include a second portion of data corresponding to labels identifying corresponding object data for objects within each portion of the input image data. The labels included within the second portion of data within the detector training dataset can be manually annotated, automatically annotated, or annotated using a combination of automatic labeling and manual labeling.

In some implementations, to train the machine-learned detector model, the training computing system can input a first portion of a set of ground-truth data (e.g., the first portion of the detector training dataset corresponding to input image data) into the machine-learned detector model. In response to receipt of such first portion, the machine-learned detector model can output object data for objects detected within the input image data. This output of the machine-learned detector model predicts the remainder of the set of ground-truth data (e.g., the second portion of the detector training dataset). After such prediction, the training computing system can apply or otherwise determine a loss function that compares the object data output by the machine-learned detector model to the remainder of the ground-truth data which the detector model attempted to predict. The training computing system then can back-propagate the loss function through the detector model to train the detector model (e.g., by modifying one or more weights associated with the detector model). This process of inputting ground-truth data, determining a loss function and back-propagating the loss function through the detector model can be repeated numerous times as part of training the detector model. For example, the process can be repeated for each of numerous sets of ground-truth data provided within the detector training dataset.

In some implementations, to train the machine-learned detector model, the training computing system can generate a first portion of a set of ground-truth data based on one or more images obtained by a camera and one or more labels identifying corresponding object data for objects within the one or more images. The training computing system can reproject the one or more images to generate one or more reprojected images, and synchronize the one or more reprojected images with the one or more labels to generate the ground-truth data. The generated ground-truth data can be used to adjust one or more parameters of the machine-learned detector model.

In some implementations, to train the machine-learned detector model, the training computing system can generate a second portion of a set of ground-truth data based on a pixel-wise ground-truth label image. The pixel-wise ground-truth label image can represent the one or more labels identifying corresponding object data for objects within one or more images of a first portion of the set of ground-truth data. The pixel-wise ground-truth label image can be associated with a pixel-wise representation (e.g., grid-view) of the one or more labels (e.g., a pixel representing an object is labeled as an object, a pixel representing a free space is labeled as a free space, etc.). The training computing system can perform ray tracing on the pixel-wise ground-truth label image associated with the pixel-wise representation, to generate a radial ground-truth label image associated with a radial representation (e.g., radial-view) of the one or more labels (e.g., a first object is located at a first offset and a first distance from the autonomous vehicle, a second object is located at a second offset and a second distance from the autonomous vehicle, a free space is located at a third offset and a third distance from the autonomous vehicle, etc.). In particular, the training computing system can trace one or more rays originating from a reference point in the pixel-wise ground-truth label image, and terminating at one or more objects labeled in the pixel-wise ground-truth label image, to generate the radial ground-truth label image. The training computing system can use the radial ground-truth label image for the second portion of the set of ground-truth data.

As an example, a training computing system can perform a radial sweep of a pixel-wise ground-truth label image with respect to a reference point in the pixel-wise ground-truth label image, such that the training computing system traces a plurality of rays originating from the reference point in 1° (degree) increments between 0° and 180° (degrees).

In some implementations, to train the machine-learned detector model, the training computing system can perform non-uniform ray tracing on a pixel-wise ground-truth label image to generate a radial ground-truth label image. In particular, the training computing system can trace one or more rays such that a ray density is higher from a reference point to one or more regions of interest in the pixel-wise ground-truth label image with respect to a ray density from the reference point to one or more other regions in the pixel-wise ground-truth label image.

As one example, a training computing system can determine that a center region of a pixel-wise ground-truth label image is a region of interest with respect to one or more peripheral regions of the pixel-wise ground-truth label image because the center region includes more useful information for motion planning. As another example, a training computing system can determine that a foreground region of a pixel-wise ground-truth label image is a region of interest with respect to one or more background regions because objects of interest are more likely to be located in foreground regions as opposed to background regions. The training computing system can perform a radial sweep of the pixel-wise ground-truth label image with respect to a reference point in the pixel-wise ground-truth label image, such that the training computing system traces a plurality of rays originating from the reference point and terminating in the peripheral region (or background region) of the pixel-wise ground-truth label image with a relatively lower ray density, and such that the training computing system traces a plurality of rays originating from the reference point and terminating in the center region (or foreground region) of the pixel-wise ground-truth label image with a relatively higher ray density.

As another example, a training computing system can determine that a centerline or driving path of an autonomous vehicle through an environment depicted in a pixel-wise ground-truth label image is a region of interest. The training computing system can perform a radial sweep of the pixel-wise ground-truth label image with respect to a reference point in the pixel-wise ground-truth label image, such that the training computing system traces a plurality of rays originating from the reference point and terminating in the region of interest includes a relatively higher ray density with respect to other regions in the pixel-wise ground-truth label image.

In some implementations, an output of the machine-learned detector model (e.g., object data for objects detected within the input image data), can be used to determine a free space in the environment proximate to the autonomous vehicle. For example, the object data characterizing the one or more objects in the environment can include a distance from a given reference point to each object detected in the environment. The object data can be used to identify one or more objects in the environment, and determine the free space in the environment based at least in part on the one or more objects identified in the environment. For example, the computing system can generate a graphical and/or non-graphical representation of free space in the environment proximate to the autonomous vehicle based at least in part on the one or more objects identified in the environment.

The autonomous vehicle can include a sensor system as described above as well as a vehicle computing system that implements a variety of systems on-board the autonomous vehicle (e.g., located on or within the autonomous vehicle) for autonomous navigation. For instance, the vehicle computing system can include a vehicle control system (e.g., for controlling one or more systems responsible for powertrain, steering, braking, etc.), and an autonomy computing system (e.g., for planning and executing autonomous navigation). The autonomy computing system can include a perception system, a prediction system, and a motion planning system that cooperate to perceive the environment proximate to the autonomous vehicle and determine a motion plan for controlling the motion of the autonomous vehicle accordingly. The vehicle computing system can receive sensor data from the sensor system as described above and utilize such sensor data in the ultimate motion planning of the autonomous vehicle.

In particular, in some implementations, the perception system can receive sensor data from one or more sensors (e.g., a plurality of cameras) that are coupled to or otherwise included within the sensor system of the autonomous vehicle. The sensor data can include data that describes the environment proximate to the autonomous vehicle at one or more times. The sensor data can include for example, sensor data, image data, etc.

As an example, an autonomous vehicle sensor system can be mounted on the roof of an autonomous vehicle and include a camera system to capture sensor data. The camera system can capture a variety of sensor data and provide it to a vehicle computing system, for example, for the detection, localization, classification, and tracking of objects of interest during the operation of the autonomous vehicle.

The perception system can identify one or more objects that are proximate to the autonomous vehicle based on sensor data received from the one or more sensors. In particular, in some implementations, the perception system can determine, for each object, state data that describes a current state of such object. As examples, the state data for each object can describe an estimate of the object's current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle versus pedestrian versus bicycle versus other); yaw rate; and/or other state information. In some implementations, the perception system can determine state data for each object over a number of iterations. In particular, the perception system can update the state data for each object at each iteration. Thus, the perception system can detect and track objects (e.g., vehicles, bicycles, pedestrians, etc.) that are proximate to the autonomous vehicle over time, and thereby produce a presentation of the world around an autonomous vehicle along with its state (e.g., a presentation of the objects of interest within a scene at the current time along with the states of the objects).

The prediction system can receive the state data from the perception system and predict one or more future locations for each object based on such state data. For example, the prediction system can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system can determine a motion plan for the autonomous vehicle based at least in part on predicted one or more future locations for the object and/or the state data for the object provided by the perception system. Stated differently, given information about the current locations of objects and/or predicted future locations of proximate objects, the motion planning system can determine a free space in the environment proximate to the autonomous vehicle, and determine a motion plan for the autonomous vehicle that best navigates the autonomous vehicle along the determined travel route relative to the objects at such locations, through the free space.

As one example, in some implementations, the motion planning system can determine a cost function for each of one or more candidate motion plans for the autonomous vehicle based at least in part on the current locations and/or predicted future locations of the objects. For example, the cost function can describe a cost (e.g., over time) of adhering to a particular candidate motion plan. For example, the cost described by a cost function can increase when the autonomous vehicle approaches impact with another object and/or deviates from a preferred pathway (e.g., a predetermined travel route).

Thus, given information about the current locations and/or predicted future locations of objects, the motion planning system can determine a cost of adhering to a particular candidate pathway. The motion planning system can select or determine a motion plan for the autonomous vehicle based at least in part on the cost function(s). For example, the motion plan that minimizes the cost function can be selected or otherwise determined. The motion planning system then can provide the selected motion plan to a vehicle controller that controls one or more vehicle controls (e.g., actuators or other devices that control gas flow, steering, braking, etc.) to execute the selected motion plan.

The systems and methods described herein may provide a number of technical effects and benefits. By reprojecting image data, an object detection system according to embodiments of the present disclosure can provide a technical effect and benefit of improved accuracy for detecting objects of interest. For example, if image data is reprojected into a top-down image, objects that are close together can be more easily detected. Additionally, by using a reprojected image with a machine-learned detector model as described herein, an object detection system according to embodiments of the present disclosure can provide a technical effect and benefit of improved accuracy for detecting objects of interest. Furthermore, an object detection system according to example embodiments of the present disclosure can provide a technical effect and benefit of improved efficiency and/or reduced latency.

The systems and methods described herein may thereby improve the classification and tracking of such objects of interest in a perception system of an autonomous vehicle. Such improved object detection accuracy and efficiency can be particularly advantageous for use in conjunction with vehicle computing systems for autonomous vehicles. Because vehicle computing systems for autonomous vehicles are tasked with repeatedly detecting and analyzing objects in sensor data for tracking and classification of objects of interest (including other vehicles, cyclists, pedestrians, traffic control devices, and the like) and then determining necessary responses to such objects of interest, improved object detection accuracy allows for faster and more accurate object tracking and classification. Improved object tracking and classification can have a direct effect on the provision of safer and smoother automated control of vehicle systems and improved overall performance of autonomous vehicles.

The systems and methods described herein may also provide a technical effect and benefit of improving reliability by using image data to detect, classify, and track objects of interest in conjunction with a LIDAR system and/or a RADAR system. In this way, object detection based on one system can be verified against object detection based on another system, and a confidence of the detection can be increased.

The systems and methods described herein may also provide resulting improvements to computing technology tasked with object detection, tracking, and classification. The systems and methods described herein may provide improvements in the speed and accuracy of object detection and classification, resulting in improved operational speed and reduced processing requirements for vehicle computing systems, and ultimately more efficient vehicle control.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104.

In some implementations, the system 100 can include one or more remote computing system(s) 103 that are remote from the vehicle 104. The remote computing system(s) 103 can include an operations computing system 120. The remote computing system(s) 103 can be separate from one another or share computing device(s). The operations computing system 120 can remotely manage the vehicle 104.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

As shown in FIG. 1, the vehicle 104 can include one or more sensors 108, an autonomy computing system 110, a vehicle control system 112, a communications system 114, and a memory system 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include sensor data captured by the one or more sensor(s) 108, such as, for example, image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

Figure 2:
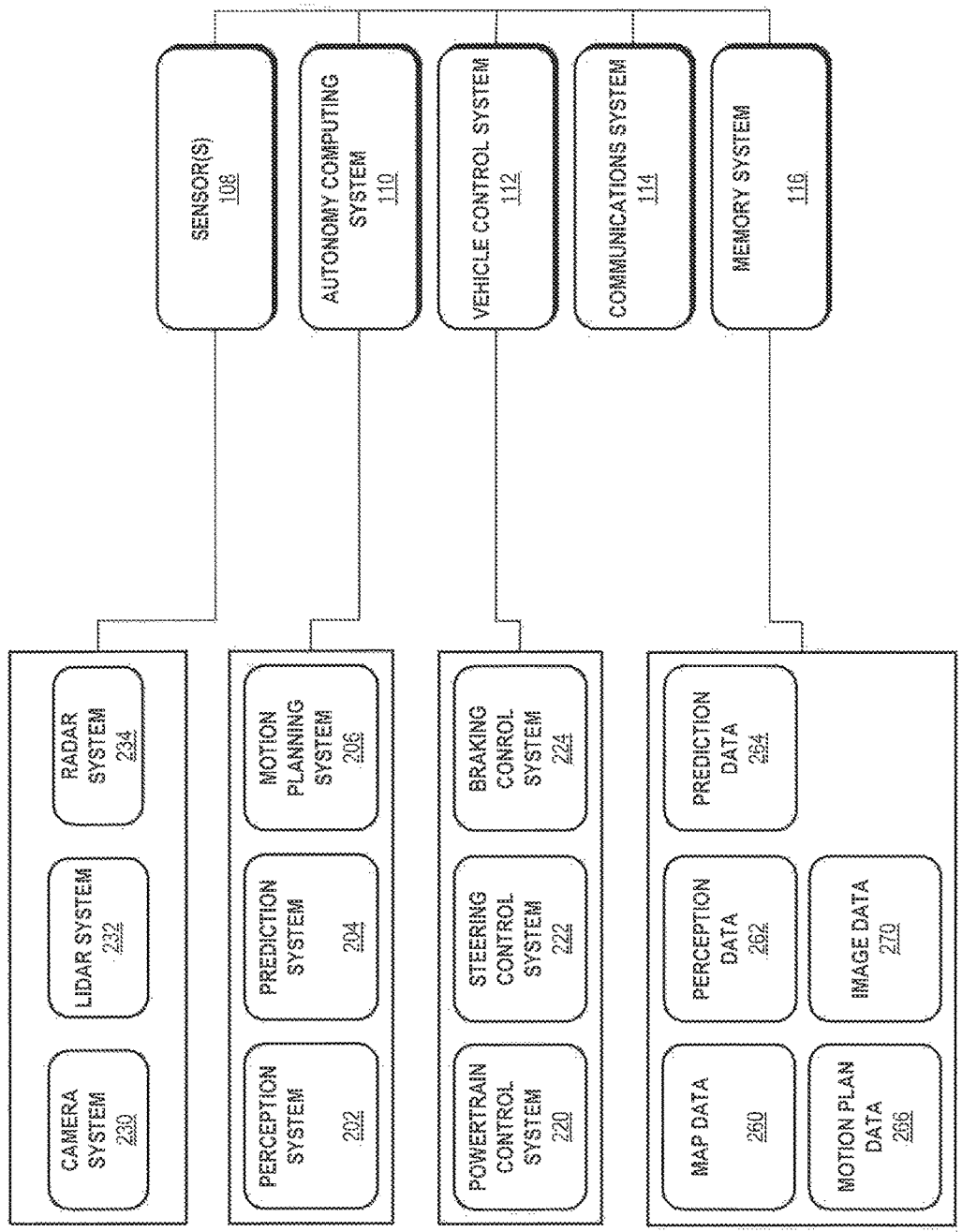
FIG. 2 depicts a block diagram of an example system overview according to example embodiments of the present disclosure.

As shown in FIG. 2, the sensor(s) 108 can include a camera system 230 that includes one or more camera(s), a LIDAR system 232, and a RADAR system 234. The one or more sensor(s) can capture a variety of sensor data indicative of an environment proximate to the autonomous vehicle.

The autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with other computing systems (e.g., remote computing system(s) 103). For example, the vehicle computing system 102 can use the communications system 114 to communicate with the operations computing system 120 over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), including, for example, transmitters, receivers, ports, controllers, antennas, and/or other suitable sub-systems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, and image data 270.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The image data 270 can include information representing an environment proximate to the autonomous vehicle at one or more times. The image data 270 can include, for example, one or more images projected from sensor data captured by the camera system 230, one or more stitched images, one or more reprojected images, and/or one or more graphical representations of free space in the environment proximate to the vehicle 104.

Figure 3A:
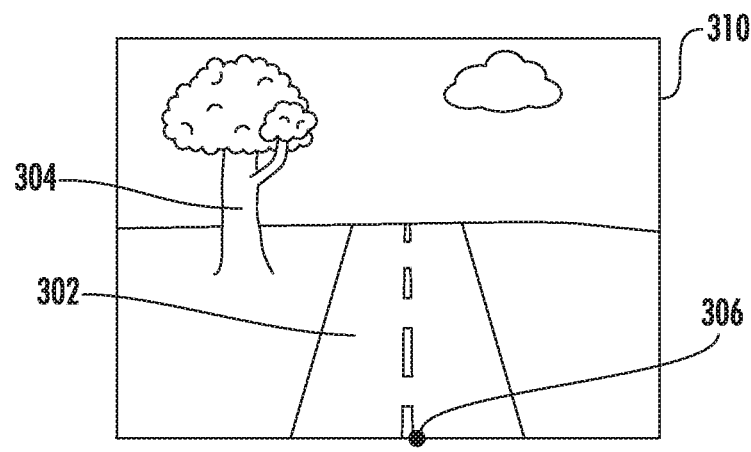
FIGS. 3A and 3B depict example image data according to example embodiments of the present disclosure.
Figure 3B:
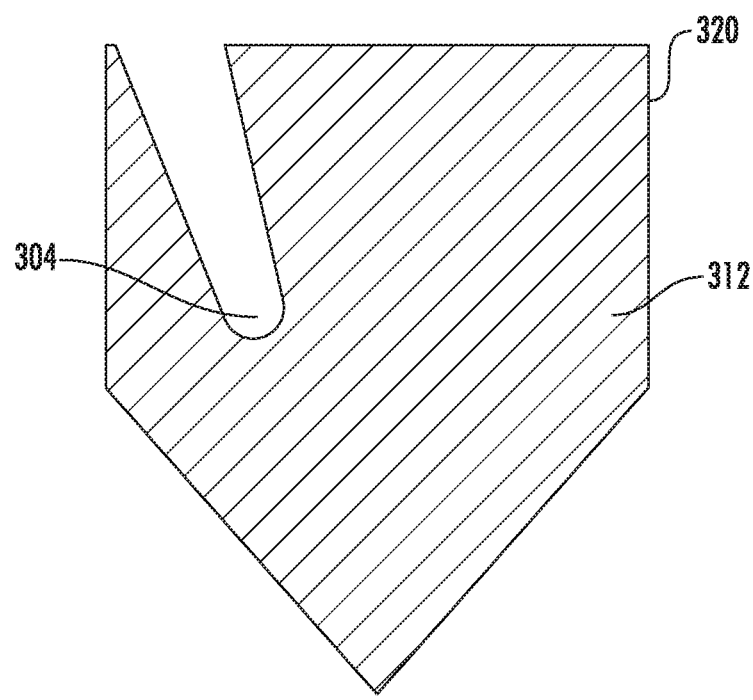

FIGS. 3A and 3B depict example image data according to example embodiments of the present disclosure. As shown in FIG. 3A, the image data can include a front-facing image 310 generated by projecting sensor data captured by a front-facing camera. The image 310 can depict an environment that includes a road 302 and a tree 304. The image 310 can include a reference point 306 that corresponds to a geographic location of the front-facing camera mounted on the vehicle 104.

As shown in FIG. 3B, the image data can include a graphical representation 320 of free space in the front-facing image 310. The graphical representation 320 can depict a location of the tree 304 with respect to the reference point 306, and a free space 312 that excludes the location of the tree 304 and a portion of an environment occluded by the tree 304.

Figure 4B:
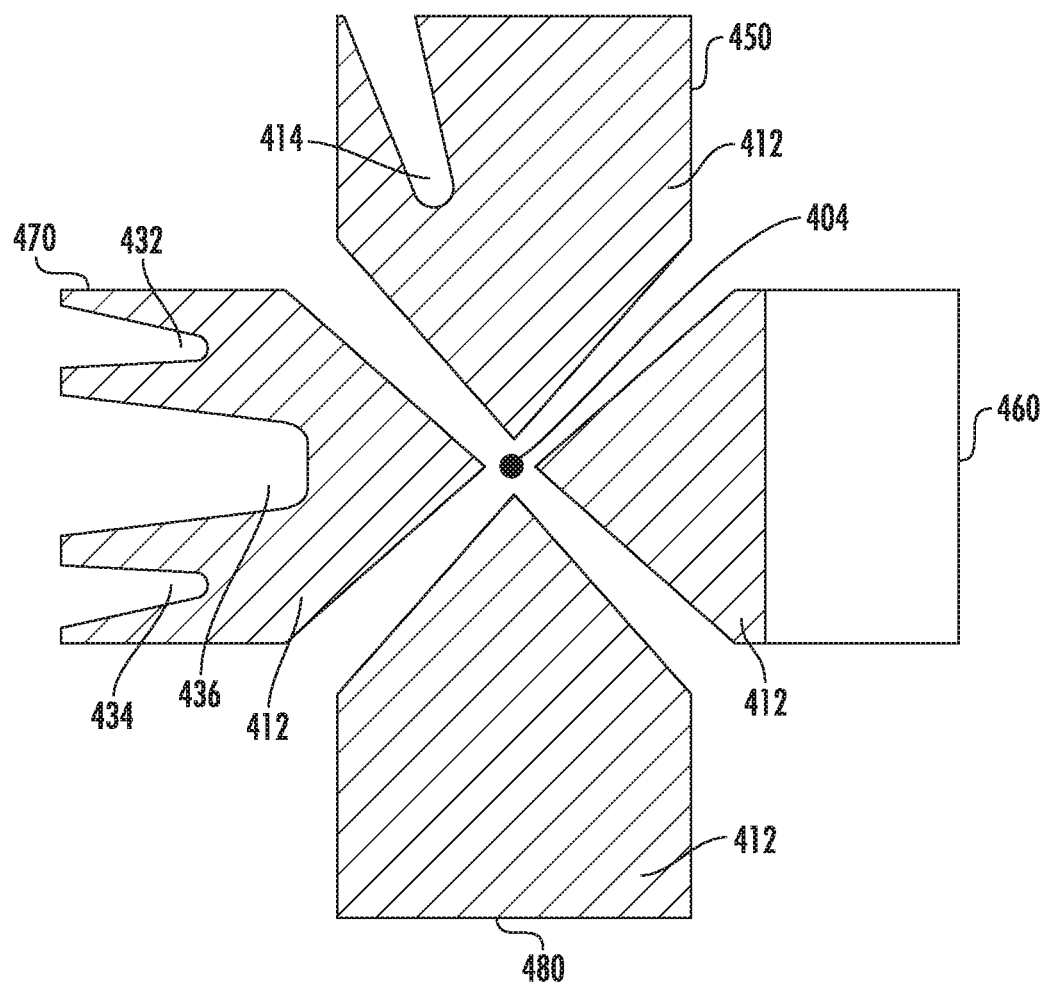

FIGS. 4A and 4B depict example image data according to example embodiments of the present disclosure. As shown in FIG. 4A, the image data can include a front-facing image 410, a right-facing image 420, a left-facing image 430, and a rear-facing image 440 generated by projecting sensor data captured by a front-facing camera, right-facing camera, left-facing camera, and rear-facing camera, respectively, that are mounted on the vehicle 104. The images 410, 420, 430, and 440 can be stitched to generate an approximately 360-degree image of an environment proximate to the vehicle 104. The front-facing image 410 can depict a tree 414, and the left-facing image 440 can depict trees 432, 434, and a vehicle 436.

As shown in FIG. 4B, the image data can include graphical representations 450, 460, 470, and 480 of free space in the front-facing image 410, right-facing image 420, left-facing image 430, and rear-facing image 440, respectively. The graphical representation 450 can depict a location of the tree 414 with respect to the reference point 404, and the graphical representation 470 can depict a location of the trees 432, 434, and the vehicle 436, with respect to the reference point 404. The graphical representations 450, 460, 470, and 480 can also depict a free space 412 that excludes the locations of objects and occluded regions in an environment proximate to the vehicle 104.

Figure 5A:
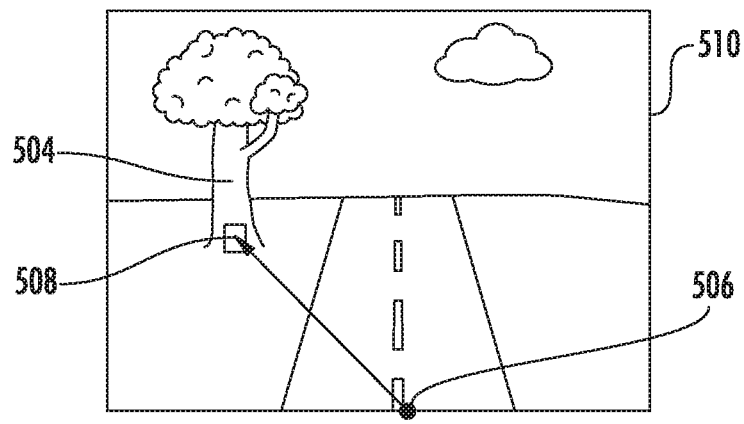
FIGS. 5A and 5B depict example image data used to train a machine-learned detector model according to example embodiments of the present disclosure.
Figure 5B:
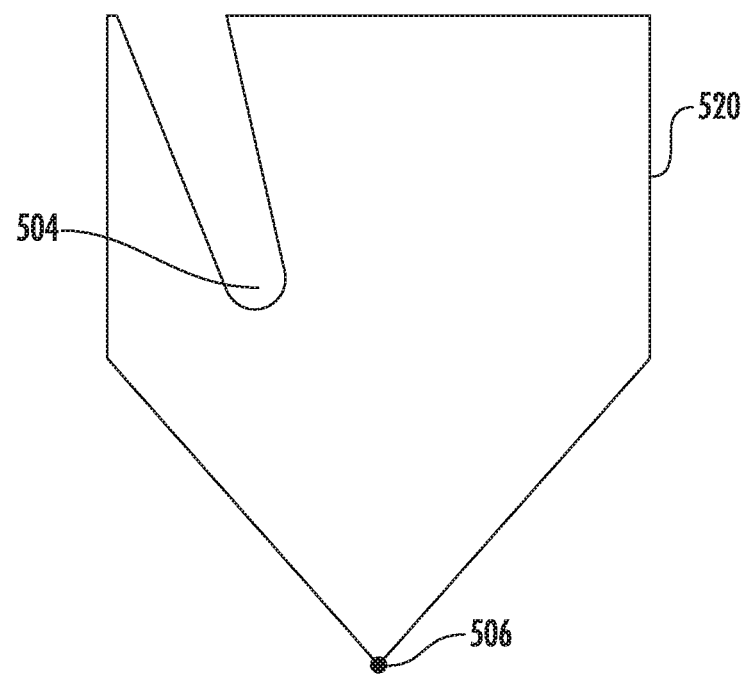

FIGS. 5A and 5B depict example image data used to train the machine-learned detector model according to example embodiments of the present disclosure. The image data can include an image 510 (e.g., pixel-wise ground-truth label image). As shown in FIG. 5A, a training computing system can use a ray-tracing approach to trace a ray from a reference point 506 in the image 510 to a location of a pixel 508 that belongs to the tree 504. As shown in FIG. 5B, the training computing system can determine a distance traversed by the ray to generate the image 520 (e.g., radial ground-truth label image).

Figure 6A:
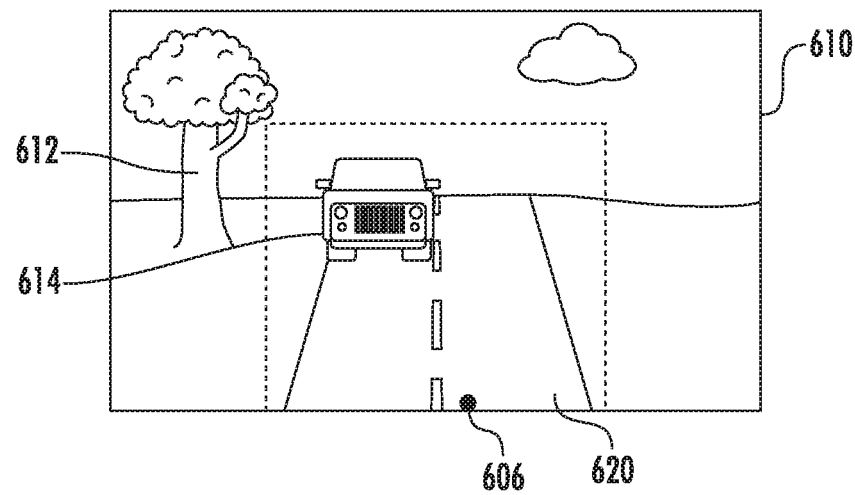
FIGS. 6A, 6B, and 6C depict example image data used to train a machine-learned detector model according to example embodiments of the present disclosure.
Figure 6B:
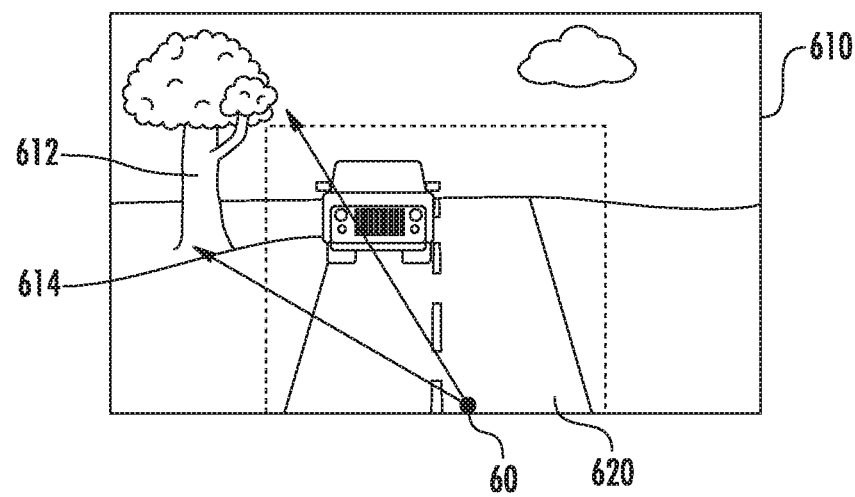
Figure 6C:
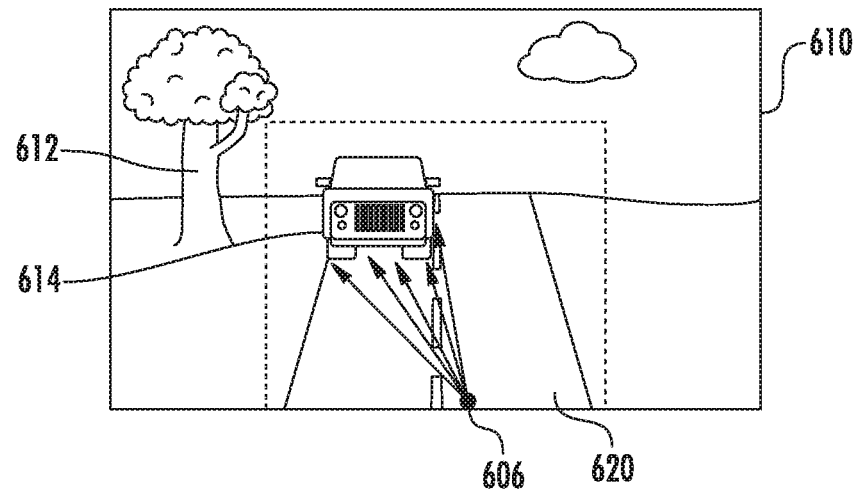

FIGS. 6A, 6B, and 6C depict example image data used to train the machine-learned detector model according to example embodiments of the present disclosure. The image data can include an image 610 (e.g., pixel-wise ground-truth label image) that depicts a tree 612 and a vehicle 614. As shown in FIG. 6A, a training computing system can determine a region of interest 620 in the image 610. As shown in FIG. 6B, the training computing system can use a non-uniform ray-tracing approach to trace a plurality of rays (e.g., a first and second ray) from a reference point 606 to the tree 612 that is outside the region of interest 620. As shown in FIG. 6C, the training computing system can use a non-uniform ray-tracing approach to trace a plurality of rays (e.g., a first, second, third, fourth, and fifth ray) from the reference point 606 to the vehicle 614 that is inside the region of interest 620.

Figure 7:
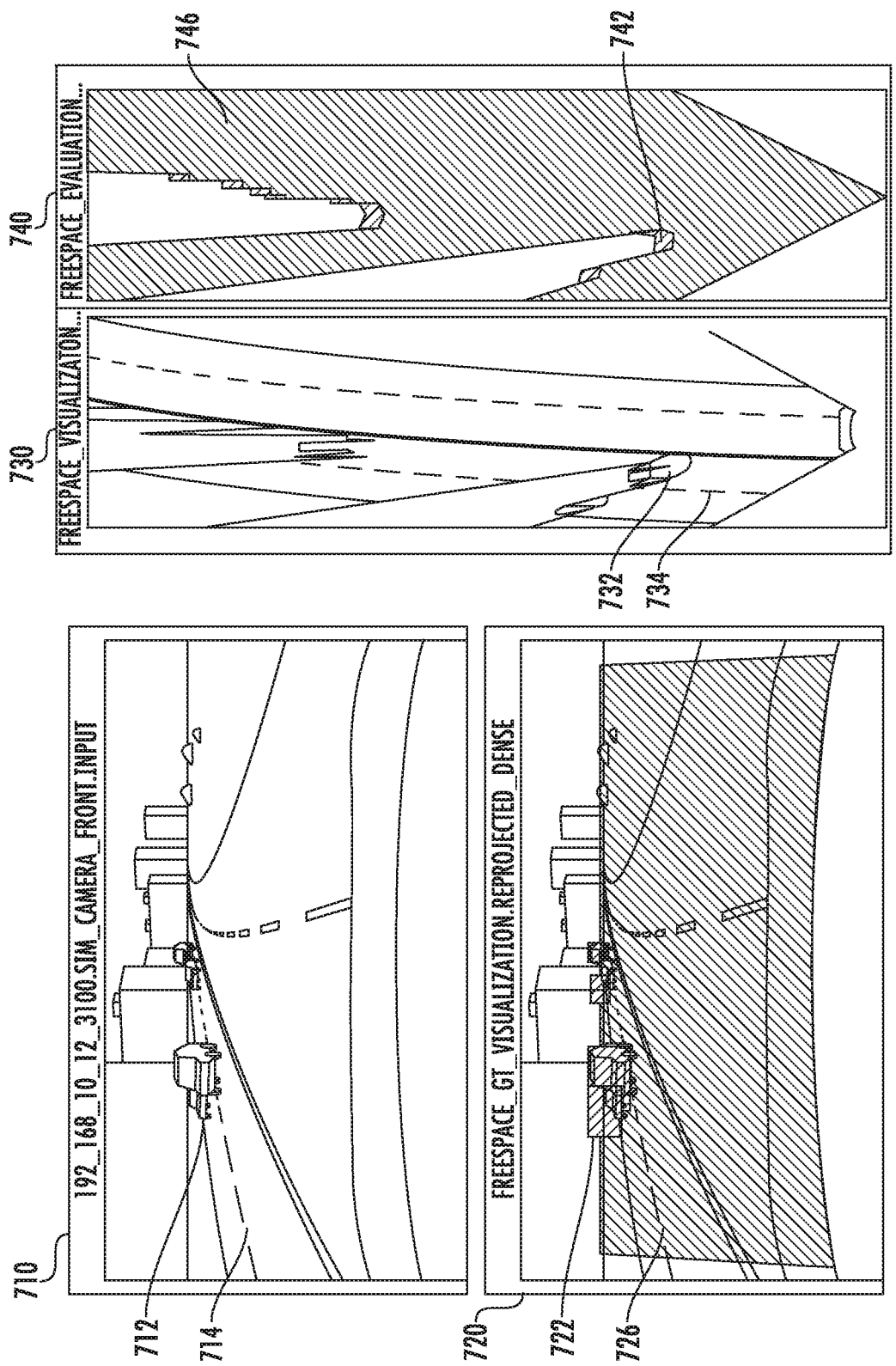
FIG. 7 depicts example system components, according to example embodiments of the present disclosure.

FIG. 7 depicts example image data according to example embodiments of the present disclosure. As shown in FIG. 7, the image data can include a first image 710, second image 720, third image 730, and fourth image 740. The first image 710 can be generated by projecting sensor data captured by the camera system 230 on-board the vehicle 104. The first image 710 can depict one or more vehicles 712 and a road 714. The first image 710 can be processed by the autonomy computing system 110 to determine a free space about the vehicle 104 and to generate the second image 720 that depicts a graphical representation of the free space. The second image 720 can depict objects 722 that are proximate to the autonomous vehicle based on an identification of the vehicles 712, and depict a free space 726 proximate to the vehicle 104. The first image 710 can be reprojected to generate the third image 730. The third image 730 can depict one or more vehicles 732 that correspond to the one or more vehicles 712, and depict the road 734 that corresponds to the road 714. The second image 720 can be reprojected to generate the fourth image 740. The fourth image 740 can depict one or more vehicles 742 that correspond to the one or more vehicles 722, and depict a free space 746 that corresponds to the free space 726.

Figure 8:
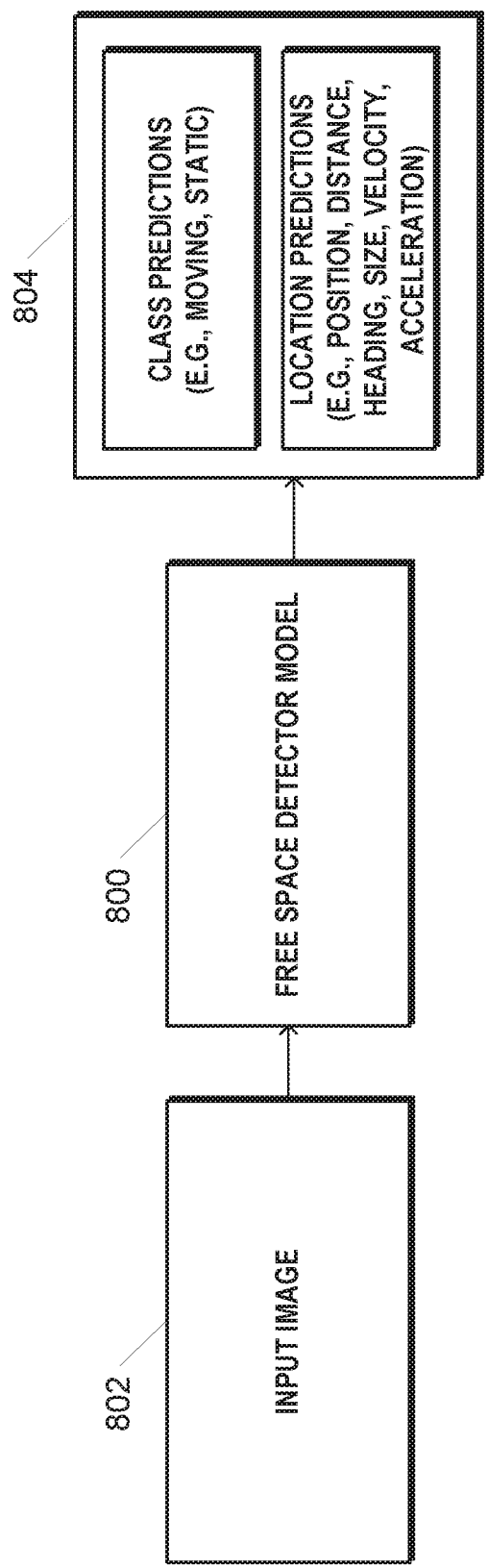
FIG. 8 depicts a block diagram of an example free space detection system according to example embodiments of the present disclosure.

FIG. 8 depicts a block diagram of an example free space detector model 800 according to example embodiments of the present disclosure. In some implementations, the free space detector model 800 is trained to receive data representing an input image 802 and, as a result of receipt of the input image 802, provide an output 804 including data representing an identification of one or more objects, a classification of the one or more objects, and/or a predicted location of the one or more objects. The output 804 can include, for example, a class prediction of an object that indicates whether the it is a moving object or static object; and a location prediction of an object that indicates a position, distance, heading, size, velocity, and acceleration associated with the object.

Figure 9:
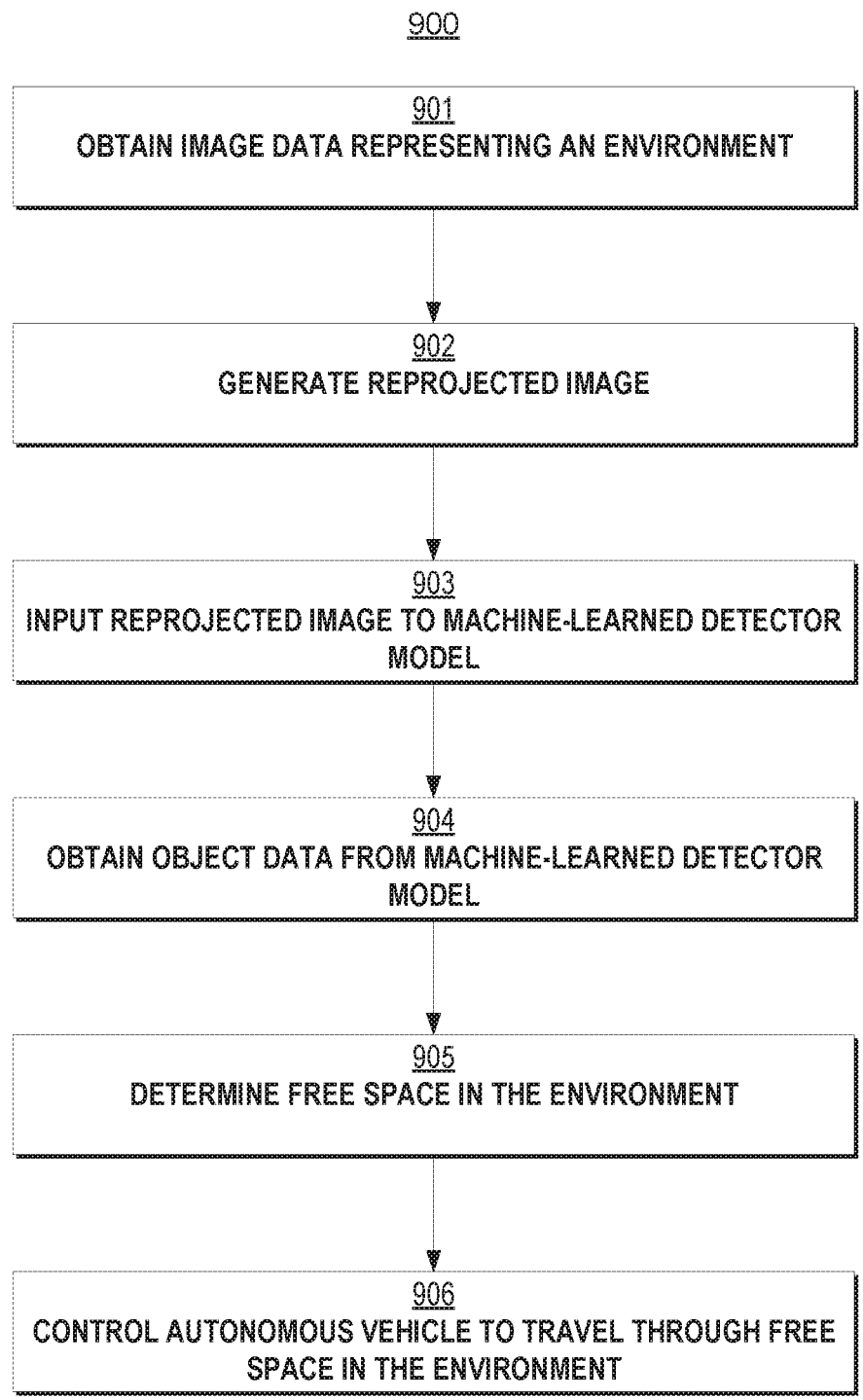
FIG. 9 depicts a flow diagram of detecting free space according to example embodiments of the present disclosure.
Figure 10:
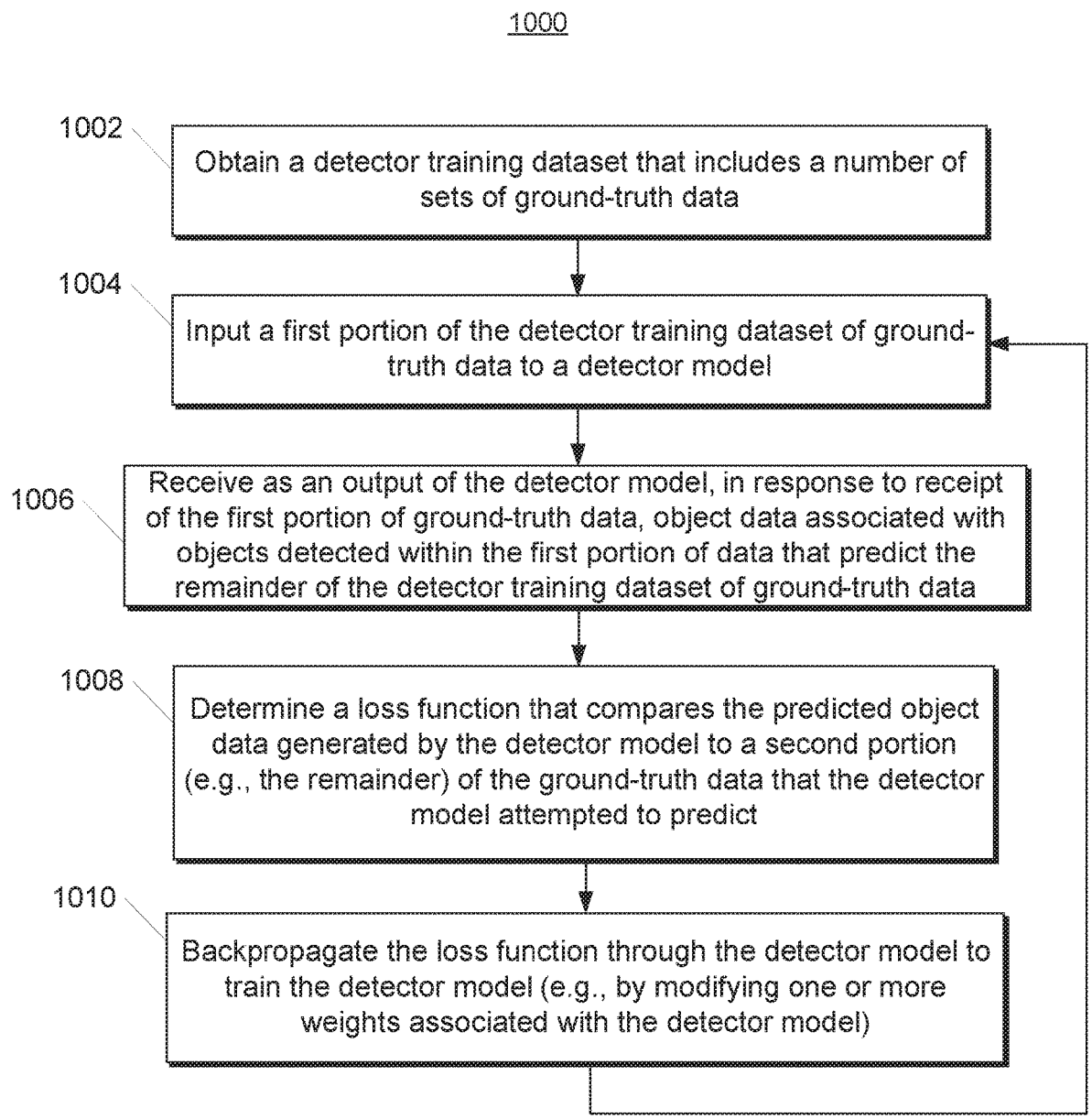
FIG. 10 depicts a flow diagram of training a machine-learned detector model according to example embodiments of the present disclosure.

FIGS. 9 and 10 depict flow diagrams of example methods 900 and 1000 for controlling an autonomous vehicle according to example embodiments of the present disclosure. One or more portion(s) of the methods 900 and 1000 can be implemented as operations by one or more computing system(s) such as, for example, the computing system(s) 102, 120, 1102, and 1130 shown in FIGS. 1, 2, and 11.

Moreover, one or more portion(s) of the methods 900 and 1000 can be implemented as an algorithm on the hardware components of the system(s) described herein (e.g., as in FIGS. 1, 2, and 11) to, for example, detect a free space proximate to the autonomous vehicle 104.

FIG. 9 depicts a diagram of a method 900 for detecting free space in an environment proximate to the vehicle 104.

At (901), the method 900 can include obtaining image data representing an environment. For example, the vehicle computing system 102 can obtain sensor data indicative of an environment proximate to the vehicle 104 captured by the camera system 230. The sensor data can correspond to a perspective associated with the camera system 230. The perspective associated with the camera system 230 can include a perspective associated with one or more locations proximate to a motion path of the vehicle 104. The vehicle computing system 102 can project the sensor data to generate image data representing the environment proximate to the vehicle 104. The image data can comprise a plurality of pixels that are associated with a plurality of distances in the environment proximate to the vehicle 104. The image data can include a front-facing image representing the environment from a perspective of a direction that the vehicle 104 is facing. The image data can include a side-facing image representing the environment from a perspective of a direction substantially orthogonal to a direction that the vehicle 104 is facing, and a rear-facing image representing the environment from a perspective of a direction substantially opposite to a direction that the vehicle 104 is facing. The image data can include a cylindrical image representing the environment from an approximately 360-degree perspective around the vehicle 104.

At (902), the method 900 can include generating a reprojected image. For example, the vehicle computing system 102 can reproject the image data to generate a reprojected image. The reprojected image can comprise a plurality of pixels, each pixel associated with a single fixed distance in the environment proximate to the vehicle 104.

At (903), the method 900 can include inputting the reprojected image to a machine-learned detector model. For example, the vehicle computing system 102 can input the reprojected image to a machine-learned detector model.

At (904), the method 900 can include obtaining object data from the machine-learned detector model. For example, the vehicle computing system 102 can obtain, as an output of the machine-learned detector model, object data characterizing one or more objects in the environment proximate to the vehicle 104. The object data can include a predicted identification of one or more objects in the environment, a predicted classification of the one or more objects, and an estimated distance from the vehicle 104 to the one or more objects. The predicted classification of the one or more objects can indicate whether each object is a moving object or a stationary object.

At (905), the method 900 can include determining a free space in the environment. For example, the vehicle computing system 102 can determine free space in the environment proximate to the vehicle 104, based on the object data. The free space in the environment can include one or more regions that the vehicle 104 can travel without colliding with the one or more objects in the environment proximate to the vehicle 104.

At (906), the method 900 can include controlling an autonomous vehicle to travel through the free space in the environment. For example, the vehicle computing system 102 can control the vehicle 104 to travel through the determined free space in the environment proximate to the vehicle 104.

FIG. 10 depicts a diagram of a method 1000 for training a machine-learned detector model.

At (1002), the method 1000 can include obtaining a detector training dataset that includes a number of sets of ground-truth data.

At (1004), the method 1000 can include inputting a first portion of the detector training dataset of ground-truth data to a detector model.

At (1006), the method 1000 can include receiving as an output of the detector model, in response to receipt of the first portion of ground-truth data, object data associated with objects detected within the first portion of data that predict the remainder of the detector training dataset of ground-truth data.

At (1008), the method 1000 can include determining a loss function that compares the predicted object data generated by the detector model to a second portion (e.g., the remainder) of the ground-truth data that the detector model attempted to predict.

At (1010), the method 1000 can include back-propagating the loss function through the detector model to train the detector model (e.g., by modifying one or more weights associated with the detector model).

Figure 11:
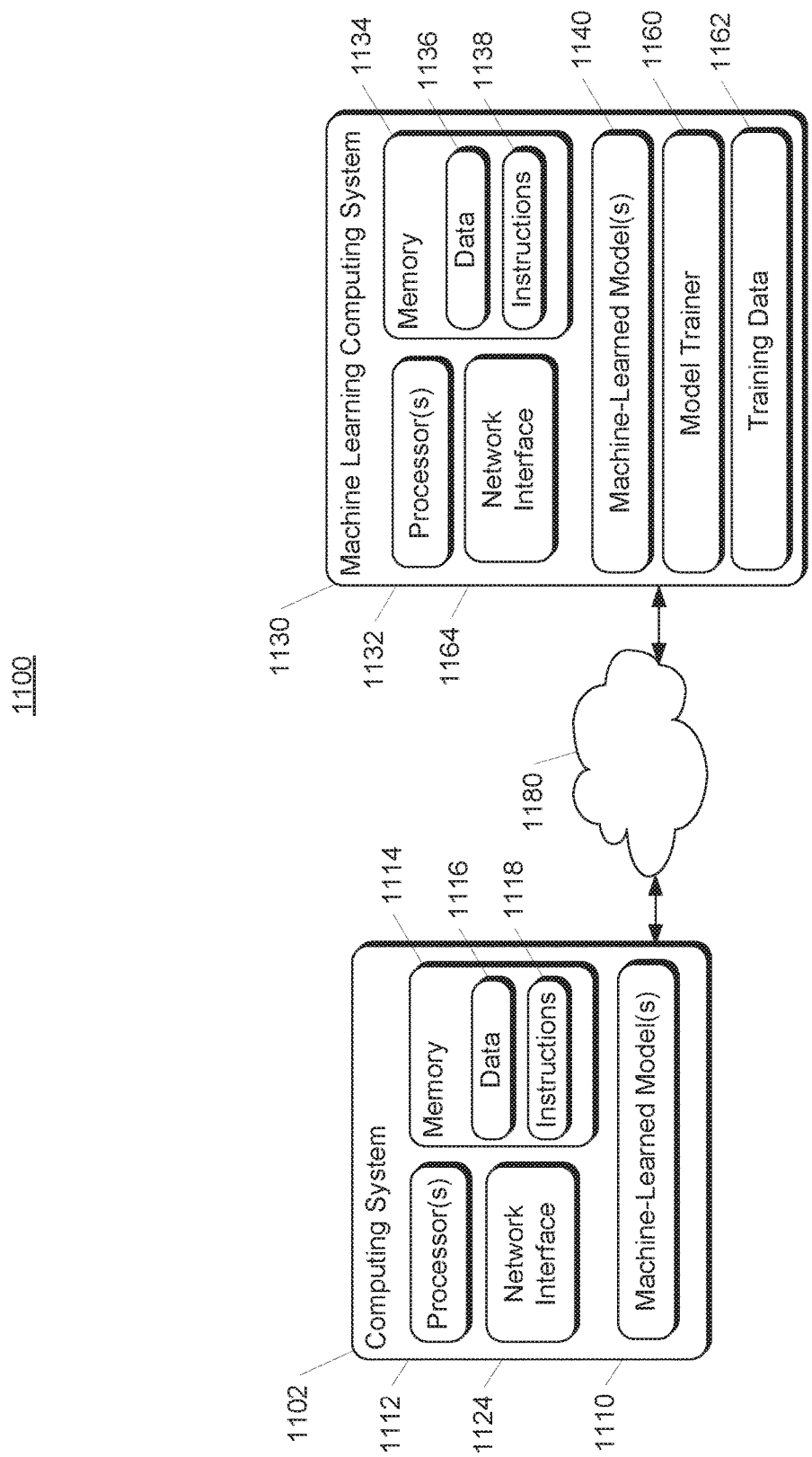
FIG. 11 depicts a block diagram of an example computing system according to example embodiments of the present disclosure.

FIG. 11 depicts a block diagram of an example computing system 1100 according to example embodiments of the present disclosure. The example system 1100 includes a computing system 1102 and a machine learning computing system 1130 that are communicatively coupled over a network 1180.

In some implementations, the computing system 1102 can perform autonomous vehicle motion planning including object detection, tracking, and/or classification (e.g., determining object data and/or free space as described herein). In some implementations, the computing system 1102 can be included in an autonomous vehicle. For example, the computing system 1102 can be on-board the autonomous vehicle. In other implementations, the computing system 1102 is not located on-board the autonomous vehicle. For example, the computing system 1102 can operate offline to perform object detection including determining object data and/or free space. The computing system 1102 can include one or more distinct physical computing devices.

The computing system 1102 includes one or more processors 1112 and a memory 1114. The one or more processors 1112 can be any suitable processing device (e.g., a processor core, a microprocessor, an ASIC, a FPGA, a controller, a microcontroller, etc.) and can be one processor or a plurality of processors that are operatively connected. The memory 1114 can include one or more non-transitory computer-readable storage media, such as RAM, ROM, EEPROM, EPROM, one or more memory devices, flash memory devices, etc., and combinations thereof.

The memory 1114 can store information that can be accessed by the one or more processors 1112. For instance, the memory 1114 (e.g., one or more non-transitory computer-readable storage mediums, memory devices) can store data 1116 that can be obtained, received, accessed, written, manipulated, created, and/or stored. The data 1116 can include, for instance, sensor data obtained by camera system 230, data identifying detected and/or classified objects including current object states and predicted object locations and/or trajectories, motion plans, machine-learned models, rules, etc. as described herein. In some implementations, the computing system 1102 can obtain data from one or more memory device(s) that are remote from the system 1102.

The memory 1114 can also store computer-readable instructions 1118 that can be executed by the one or more processors 1112. The instructions 1118 can be software written in any suitable programming language or can be implemented in hardware. Additionally, or alternatively, the instructions 1118 can be executed in logically and/or virtually separate threads on processor(s) 1112.

For example, the memory 1114 can store instructions 1118 that when executed by the one or more processors 1112 cause the one or more processors 1112 to perform any of the operations and/or functions described herein, including, for example, operations 901-906 of FIG. 9.

According to an aspect of the present disclosure, the computing system 1102 can store or include one or more machine-learned models 1110. The machine-learned model(s) 1110 can include, for example, a detector model such as but not limited to free space detector model 1000 of FIG. 10. As examples, the machine-learned model(s) 1110 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

In some implementations, the computing system 1102 can receive the one or more machine-learned models 1110 from the machine learning computing system 1130 over network 1180 and can store the one or more machine-learned models 1110 in the memory 1114. The computing system 1102 can then use or otherwise implement the one or more machine-learned models 1110 (e.g., by processor(s) 1112). In particular, the computing system 1102 can implement the machine learned model(s) 1110 to determine object data and/or free space. For example, in some implementations, the computing system 1102 can employ the machine-learned model(s) 1110 by inputting an image into the machine-learned model(s) 1110 and receiving a prediction of a classification and location associated with one or more identified objects in the image as an output of the machine-learned model(s) 1110.

The machine learning computing system 1130 includes one or more processors 1132 and a memory 1134. The one or more processors 1132 can be any suitable processing device (e.g., a processor core, a microprocessor, an ASIC, a FPGA, a controller, a microcontroller, etc.) and can be one processor or a plurality of processors that are operatively connected. The memory 1134 can include one or more non-transitory computer-readable storage media, such as RAM, ROM, EEPROM, EPROM, one or more memory devices, flash memory devices, etc., and combinations thereof.

The memory 1134 can store information that can be accessed by the one or more processors 1132. For instance, the memory 1134 (e.g., one or more non-transitory computer-readable storage mediums, memory devices) can store data 1136 that can be obtained, received, accessed, written, manipulated, created, and/or stored. The data 1136 can include, for instance, sensor data, image data, data identifying detected and/or classified objects including current object states and predicted object locations and/or trajectories, motion plans, machine-learned models, rules, etc. as described herein. In some implementations, the machine learning computing system 1130 can obtain data from one or more memory device(s) that are remote from the system 1130.

The memory 1134 can also store computer-readable instructions 1138 that can be executed by the one or more processors 1132. The instructions 1138 can be software written in any suitable programming language or can be implemented in hardware. Additionally, or alternatively, the instructions 1138 can be executed in logically and/or virtually separate threads on processor(s) 1132.

For example, the memory 1134 can store instructions 1138 that when executed by the one or more processors 1132 cause the one or more processors 1132 to perform any of the operations and/or functions described herein, including, for example, operations of FIGS. 9 and 10.

In some implementations, the machine learning computing system 1130 includes one or more server computing devices. If the machine learning computing system 1130 includes multiple server computing devices, such server computing devices can operate according to various computing architectures, including, for example, sequential computing architectures, parallel computing architectures, or some combination thereof.

In addition or alternatively to the model(s) 1110 at the computing system 1102, the machine learning computing system 1130 can include one or more machine-learned models 1140. As examples, the machine-learned models 1140 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, convolutional neural networks, recurrent neural networks (e.g., long short-term memory recurrent neural networks), or other forms of neural networks.

As an example, the machine learning computing system 1130 can communicate with the computing system 1102 according to a client-server relationship. For example, the machine learning computing system 1130 can implement the machine-learned models 1140 to provide a web service to the computing system 1102. For example, the web service can provide an autonomous vehicle motion planning service.

Thus, machine-learned models 1110 can be located and used at the computing system 1102 and/or machine-learned models 1140 can be located and used at the machine learning computing system 1130.

In some implementations, the machine learning computing system 1130 and/or the computing system 1102 can train the machine-learned models 1110 and/or 1140 through use of a model trainer 1160. The model trainer 1160 can train the machine-learned models 1110 and/or 1140 using one or more training or learning algorithms. One example training technique is backwards propagation of errors. In some implementations, the model trainer 1160 can perform supervised training techniques using a set of labeled training data. In other implementations, the model trainer 1160 can perform unsupervised training techniques using a set of unlabeled training data. The model trainer 1160 can perform a number of generalization techniques to improve the generalization capability of the models being trained. Generalization techniques include weight decays, dropouts, or other techniques.

In particular, the model trainer 1160 can train a machine-learned model 1110 and/or 1140 based on a set of training data 1162. The training data 1162 can include, for example, a plurality of sets of ground truth data, each set of ground truth data including a first portion and a second portion.

The model trainer 1160 can train a machine-learned model 1110 and/or 1140, for example, by using one or more sets of ground truth data in the set of training data 1162. For each set of ground truth data including a first portion (e.g., image data) and second portion (e.g., corresponding class prediction and/or location estimate), model trainer 1160 can: provide the first portion as input into the machine-learned model 1110 and/or 1140; receive object data as an output of the machine-learned model 1110 and/or 1140; and evaluate a loss function that describes a difference between the object data received as an output of the machine-learned model 1110 and/or 1140 and the second portion of the set of ground truth data. The model trainer 1160 can train the machine-learned model 1110 and/or 1140 based at least in part on the loss function. As one example, in some implementations, the loss function can be back-propagated through the machine-learned model 1110 and/or 1140 to train the machine-learned model 1110 and/or 1140. In such fashion, the machine-learned model 1110 and/or 1140 can be trained to provide a correct class prediction and/or location/properties estimation based on the receipt of an input image. The model trainer 1160 can be implemented in hardware, firmware, and/or software controlling one or more processors.

The computing system 1102 can also include a network interface 1124 used to communicate with one or more systems or devices, including systems or devices that are remotely located from the computing system 1102. The network interface 1124 can include any circuits, components, software, etc. for communicating with one or more networks (e.g., 1180). In some implementations, the network interface 1124 can include, for example, one or more of a communications controller, receiver, transceiver, transmitter, port, conductors, software, and/or hardware for communicating data. Similarly, the machine learning computing system 1130 can include a network interface 1164.

The network(s) 1180 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1180 can be accomplished, for instance, via a network interface using any type of protocol, protection scheme, encoding, format, packaging, etc.

FIG. 11 illustrates one example computing system 1100 that can be used to implement the present disclosure. Other computing systems can be used as well. For example, in some implementations, the computing system 1102 can include the model trainer 1160 and the training dataset 1162. In such implementations, the machine-learned model(s) 1110 can be both trained and used locally at the computing system 1102. As another example, in some implementations, the computing system 1102 is not connected to other computing systems.

In addition, components illustrated and/or discussed as being included in one of the computing systems 1102 or 1130 can instead be included in another of the computing systems 1102 or 1130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of detecting free space in a surrounding environment of an autonomous vehicle, the method comprising:
    obtaining, by a computing system comprising one or more computing devices, image data from one or more cameras affixed to the autonomous vehicle, the image data comprising a representation of the surrounding environment from a perspective associated with each of the one or more cameras affixed to the autonomous vehicle;
    generating, by the computing system, a cylindrical image depicting an approximately 360-degree perspective of the surrounding environment based, at least in part, on the image data from the one or more cameras;
    generating, by the computing system, a reprojected image depicting a top-down perspective of the approximately 360-degree perspective of the surrounding environment based, at least in part, on the cylindrical image;
    inputting, by the computing system, the reprojected image to a machine-learned detector model to obtain, as an output of the machine-learned detector model, object data characterizing one or more objects in the surrounding environment;
    determining, by the computing system, a free space in the surrounding environment of the autonomous vehicle based at least in part on the object data.

2. The computer-implemented method of claim 1, further comprising:
    controlling, by the computing system, the autonomous vehicle to travel through the environment based at least in part on the determined free space.

3. The computer-implemented method of claim 1, wherein the perspective associated with the one or more cameras affixed to the autonomous vehicle is from a location that is proximate to one or more locations along a motion path of the autonomous vehicle.

4. The computer-implemented method of claim 1, wherein each pixel of the reprojected image is associated with a single fixed distance in the environment.

5. The computer-implemented method of claim 1, wherein determining, by the computing system, a free space in the environment based at least in part on the object data comprises:
   determining, by the computing system, one or more regions in the environment that the autonomous vehicle can travel without colliding with the one or more objects in the environment.

6. The computer-implemented method of claim 1, wherein the image data includes a front-facing image, the front-facing image representing the environment from a perspective of a direction that the autonomous vehicle is facing.

7. The computer-implemented method of claim 1, wherein the image data includes a plurality of images, the plurality of images representing the surrounding environment from a plurality of perspectives proximate to the autonomous vehicle, the plurality of perspectives including one or more overlapping perspectives.

8. The computer-implemented method of claim 1, wherein the object data includes a predicted identification of one or more objects in the environment, a predicted classification of the one or more objects, and an estimated distance from the autonomous vehicle to the one or more objects.

9. The computer-implemented method of claim 8, wherein the predicted classification of the one or more objects indicates whether each object is a moving object or a stationary object.

10. The computer-implemented method of claim 1, further comprising:
    determining, by the computing system, a loss function that evaluates a difference between the determined free space and a ground truth free space; and
    training, by the computing system, the machine-learned detector model based at least in part on the loss function.

11. The computer-implemented method of claim 10, wherein determining, by the computing system, a loss function that evaluates the difference between the determined free space in the environment and a ground truth free space comprises:
    obtaining, by the computing system, a first representation of the ground truth free space, the first representation corresponding to a grid-view;
    performing, by the computing system, non-uniform ray tracing on the first representation to generate a second representation of the ground truth free space, the second representation corresponding to a radial-view; and
    evaluating, by the computing system, a difference between the determined free space and the second representation of the ground truth free space, the difference being associated with the loss function.

12. A free space detection system comprising:
    one or more processors;
    a machine-learned detector model, wherein the machine-learned detector model has been trained to receive a reprojected image and, in response to receipt of the reprojected image, output object data characterizing one or more objects in a surrounding environment of an autonomous vehicle; and
    at least one tangible, non-transitory computer readable medium that stores instructions that, when executed by the one or more processors, cause the one or more processors to perform operations, the operations comprising:
        obtaining input images from one or more cameras affixed to the autonomous vehicle, wherein the input image represents the surrounding environment of the autonomous vehicle from a perspective associated with each of the one or more cameras affixed to the autonomous vehicle;
        generating a cylindrical image depicting an approximately 360-degree perspective of the surrounding environment based, at least in part, on the input images from the one or more camera
        generating the reprojected image depicting a top-down perspective of the approximately 360-degree perspective of the surrounding environment based, at least in part, on the cylindrical image;
        inputting the reprojected image to the machine-learned detector model to receive, as an output of the machine-learned detector model, object data characterizing one or more objects in the surrounding environment of the autonomous vehicle; and
        determining a free space in the surrounding environment of the autonomous vehicle based at least in part on the object data.

13. The free space detection system of claim 12, further comprising:
    generating a graphical representation of the free space in the surrounding environment of the autonomous vehicle based at least in part on the object data characterizing the one or more objects identified in the surrounding environment.

14. The free space detection system of claim 12, wherein the object data characterizing the one or more objects in the surrounding environment comprises a distance from a given reference point to each object detected in the environment.

15. The free space detection system of claim 12, wherein the machine-learned detector model comprises a neural network.

16. A computer-implemented method of detecting free space in a surrounding environment of an autonomous vehicle, the method comprising:
    obtaining, by a computing system comprising one or more computing devices, image data representing the surrounding environment of the autonomous vehicle, the image data including a representation of the surrounding environment from a perspective associated with the autonomous vehicle;
    generating, by the computing system, a reprojected image based on the image data;
    inputting, by the computing system, the reprojected image to a machine-learned detector model;
    obtaining, by the computing system, as an output of the machine-learned detector model, object data characterizing one or more objects in the environment;
    determining, by the computing system, a free space in the surrounding environment based at least in part on the object data;
    determining, by the computing system, a loss function that evaluates a difference between the determined free space and a ground truth free space; and
    training, by the computing system, the machine-learned detector model based at least in part on the loss function.

17. The computer-implemented method of claim 16, wherein determining, by the computing system, a loss function that evaluates the difference between the determined free space in the environment and a ground truth free space comprises:

obtaining, by the computing system, a first representation of the ground truth free space, the first representation corresponding to a grid-view;

performing, by the computing system, non-uniform ray tracing on the first representation to generate a second representation of the ground truth free space, the second representation corresponding to a radial-view; and evaluating, by the computing system, a difference between the determined free space and the second representation of the ground truth free space, the difference being associated with the loss function.

18. The computer-implemented method of claim 17, wherein performing, by the computing system, non-uniform ray tracing on the first representation to generate a second representation of the ground truth free space comprises:

identifying, by the computing system, a region of interest in the first representation of the ground truth free space;

performing, by the computing system, ray tracing to one or more objects in the first representation that are outside the region of interest with a first ray density; and performing, by the computing system, ray tracing to one or more objects in the first representation that are inside the region of interest with a second ray density that is higher than the first ray density.

\* \* \* \* \*